United States Patent
Haruta

(10) Patent No.: US 9,444,973 B2
(45) Date of Patent: Sep. 13, 2016

(54) IMAGE PROCESSING FOR PERFORMING A TRAPPING PROCESS OF INCREASING A DENSITY OF A PIXEL

(71) Applicant: CANON KABUSHIKI KAISHA, Tokyo (JP)

(72) Inventor: Kenichirou Haruta, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/097,240

(22) Filed: Dec. 5, 2013

(65) Prior Publication Data

US 2014/0168672 A1 Jun. 19, 2014

(30) Foreign Application Priority Data

Dec. 18, 2012 (JP) .................................. 2012-275787

(51) Int. Cl.
*H04N 1/58* (2006.01)
*G06K 15/02* (2006.01)
*H04N 1/60* (2006.01)

(52) U.S. Cl.
CPC ............ *H04N 1/58* (2013.01); *G06K 15/1825* (2013.01); *G06K 15/1868* (2013.01); *G06K 15/1878* (2013.01); *H04N 1/603* (2013.01); *H04N 1/6027* (2013.01)

(58) Field of Classification Search
None
See application file for complete search history.

(56) References Cited

U.S. PATENT DOCUMENTS

| | | | | |
|---|---|---|---|---|
| 4,794,531 A * | 12/1988 | Morishita et al. | ............ | 382/132 |
| 7,667,869 B2 * | 2/2010 | Nagao | .................. | H04N 1/6019 |
| | | | | 358/1.9 |
| 7,961,354 B2 * | 6/2011 | Eguchi | ..................... | H04N 1/58 |
| | | | | 358/2.1 |
| 8,164,794 B2 * | 4/2012 | Eguchi | ..................... | H04N 1/58 |
| | | | | 358/2.1 |
| 8,199,359 B2 * | 6/2012 | Gandhi et al. | ................. | 358/1.9 |
| 8,253,981 B2 * | 8/2012 | Eguchi | ..................... | H04N 1/58 |
| | | | | 358/1.9 |
| 8,717,623 B2 * | 5/2014 | Kim | ............................... | 358/1.9 |
| 8,958,636 B1 * | 2/2015 | McDougal | ............... | H04N 1/58 |
| | | | | 382/167 |
| 2008/0259366 A1 * | 10/2008 | Eguchi | | |
| 2010/0079524 A1 * | 4/2010 | Saita et al. | ...................... | 347/14 |
| 2010/0118322 A1 * | 5/2010 | Tsutsumi | ...................... | 358/1.9 |
| 2010/0238468 A1 * | 9/2010 | Eguchi | .......................... | 358/1.9 |
| 2011/0128556 A1 * | 6/2011 | Eguchi | .......................... | 358/1.2 |
| 2015/0015918 A1 * | 1/2015 | Eguchi | .............. | G06K 15/1872 |
| | | | | 358/3.27 |

FOREIGN PATENT DOCUMENTS

JP 2008-141623 A 6/2008

* cited by examiner

*Primary Examiner* — Scott A Rogers
(74) *Attorney, Agent, or Firm* — Fitzpatrick, Cella, Harper & Scinto

(57) ABSTRACT

An image processing apparatus is provided which includes: an inputting unit configured to input image data including a first process color and a second process color; and a determining unit configured to determine a density of the second process color for a target pixel in the inputted image data on the basis of a density of the first process color in the target pixel and on a density of the second process color in a peripheral pixel of the target pixel.

8 Claims, 11 Drawing Sheets

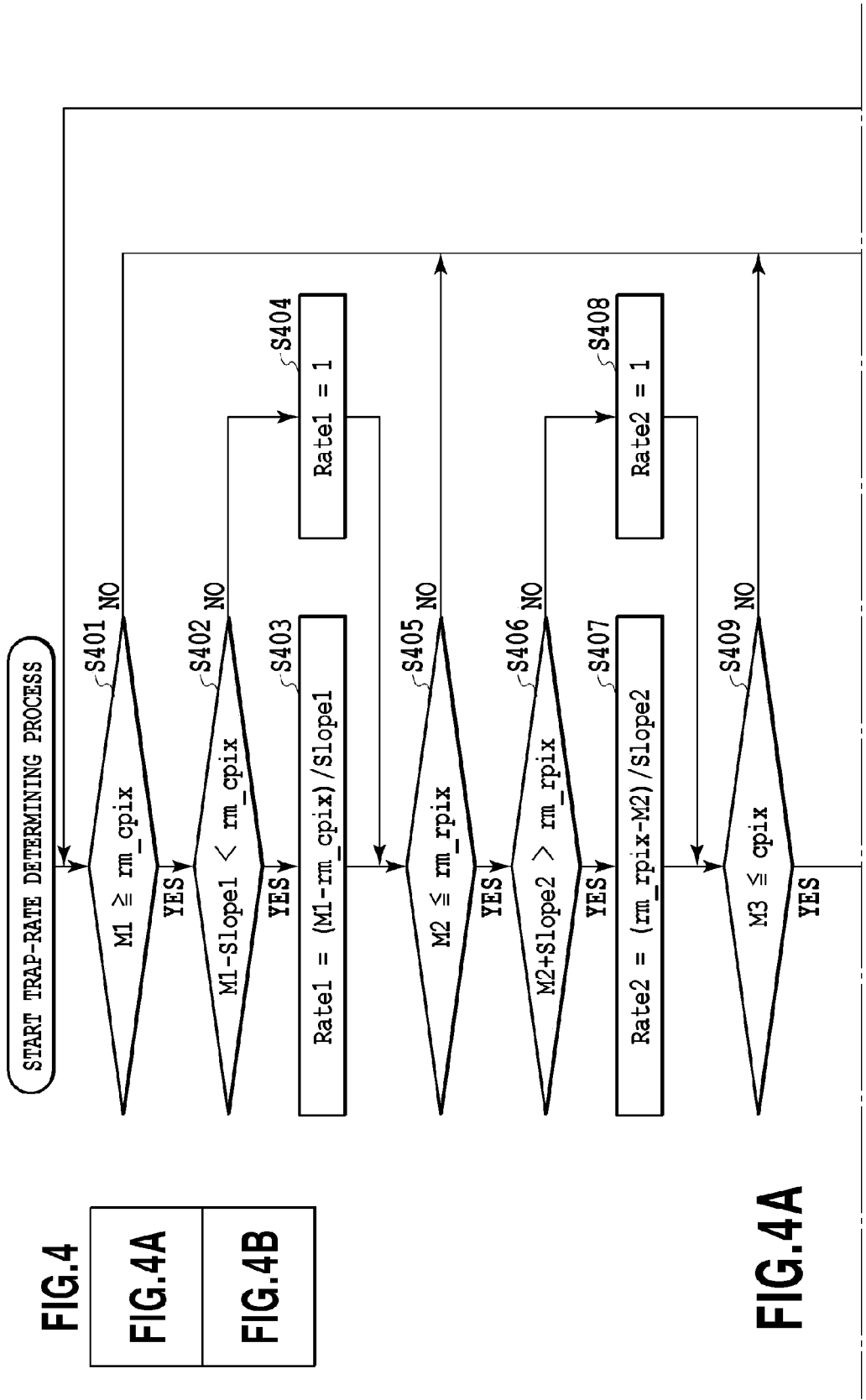

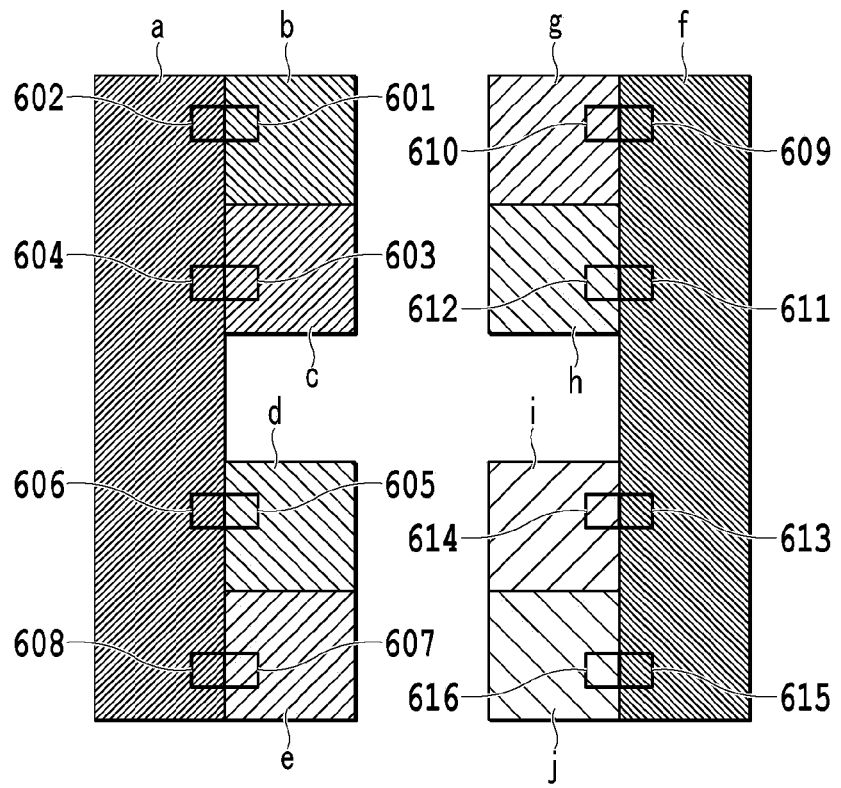
FIG.6A
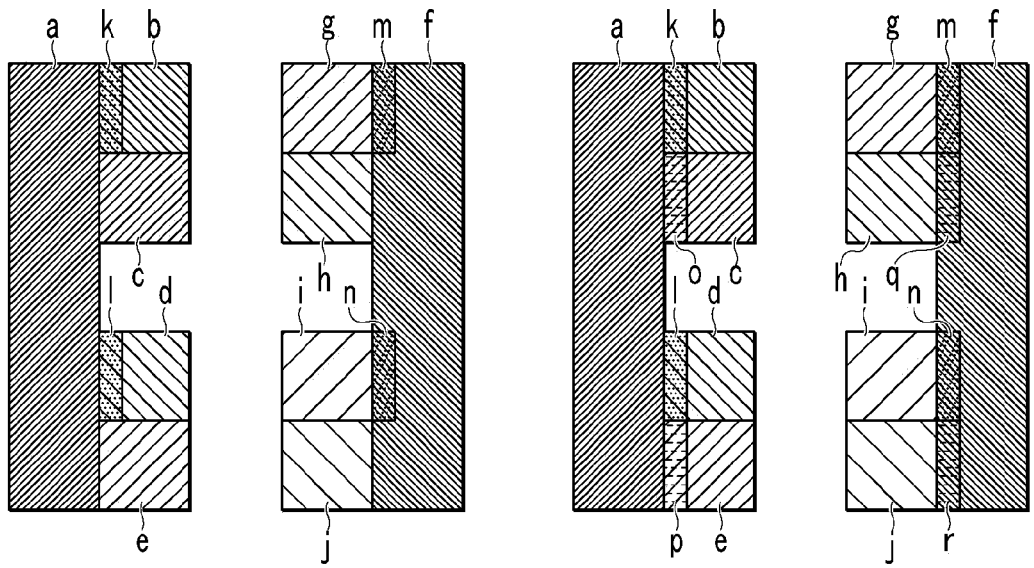
FIG.6B          FIG.6C

IMAGE PROCESSING FOR PERFORMING A TRAPPING PROCESS OF INCREASING A DENSITY OF A PIXEL

BACKGROUND OF THE INVENTION

1. Field of the Invention

The present invention relates to an image processing apparatus, and a method and a storage medium for controlling the same. More specifically, the present invention relates to an image processing technique for correcting misregistration.

2. Description of the Related Art

In color printers as color image forming apparatuses, multiple printing mechanisms configured to print different colors are arranged next to each other, and perform printing by using cyan, magenta, yellow, and black toners. This type of color printer puts images of the four toners on a recording medium one color after another. Thus, misregistration is likely to occur. Usually, misregistration of a printer occurs lengthways or sideways on the recording medium. It is difficult to completely eliminate misregistration because there are various factors that cause misregistration such as errors in the attached positions of lasers, variations in the conveyance speed of the recording medium, and unevenness in rotations of rotary bodies due to their eccentricity. For this reason, image processing called a trapping process is usually performed to correct misregistration.

Trapping is a technique that prevents a white space resulting from misregistration, by slightly expanding any one or both of colors sitting next to each other so that these colors may be printed to partly overlap one another. The method in Japanese Patent Laid-Open No. 2008-141623 is one technique related to the trapping process. In this method, a trap color is created for each target pixel by using peripheral pixels of the target pixel (hereinafter, referred to as the reference regions). The trap color refers to data on a process color to be used in the trapping of a target pixel at which a white space is formed due to misregistration. In other words, the trap color refers to data on a process color to be expanded.

In Japanese Patent Laid-Open No. 2008-141623, it is determined whether or not there is any pixel to be excluded from the reference regions. In this process, any white pixel or any whiteish light pixel (any pixel with a low density) is determined as an unnecessary pixel and excluded from the reference regions. This is because even if misregistration occurs, the resultant white space would not be noticeable and no trapping is therefore performed in a case where the density is low (light). This determination is done by comparing the density of the reference pixel and a given threshold.

However, some images may include many pixels around the threshold, or other some images may be gradation images. In such cases, the ON/OFF of trapping may be switched, thereby possibly causing degradation of the image.

Now, this problem will be described with reference to FIGS. 7A, 7B, 7C, 8A, 8B, and 8C. FIG. 7A is an input image, in which a letter part 701 is in yellow (Y) with a constant density value, and a background part 702 is in cyan (C) with varying density values due to a given background pattern. FIG. 7B is an output result obtained by processing the input image by controlling the ON/OFF of trapping based on a threshold as in the case of the conventional method. In a case where the background 702 has varying density values, particularly, in a case where the density values are varying within a range around the threshold, the ON/OFF of the trapping process is switched. Black squares and rectangles 703 in FIG. 7B are pixels on which a trapping process is performed according to the conventional method. In this example, the cyan (C) of the background part 702 is expanded to part of the yellow (Y) of the letter part. That is, printing is performed based on image data to which cyan (C) pixels are added. Due to the variations in the density value of the background part, the ON/OFF of the trapping process is switched in the letter part 701. Thus, in the output result, the edge of the letter part 701 is not smooth. FIG. 7C is an example of the ideal processing result. Black squares and rectangles 704 are pixels on which a trapping process is performed. It can be seen that the black squares and rectangles 704 are continuously connected at the edge of the letter part 701.

FIGS. 8A, 8B, and 8C are schematically enlarged views of regions 710, 720, and 730 in FIGS. 7A, 7B, and 7C, respectively. With the pixel at the upper left corner as a reference, the pixel in the fourth column from the left and the fifth row from the top will be denoted as P(4, 5). The other pixels will be denoted in a similar way.

A case under the following conditions, for example, will be described. The trap color (i.e. the process color to be expanded) is assumed to be set to cyan (C) of the background part by the user. Moreover, the threshold of the trap color (i.e. cyan) is assumed to be set to 50 by the user as a condition for the ON/OFF of trapping. As shown in FIG. 8A, the density value of cyan (C) in a pixel P(3, 4) is 53, the density value of cyan (C) in a pixel P(3, 5) is 48, and the density value of cyan in a pixel P(3, 6) is 51. The density of cyan (C) in all the pixels in the fifth to the ninth columns from the left is 0, and the density of yellow (Y) therein is 100. Likewise, the density of cyan (C) in the pixels from P(4, 1) to P(4, 6) and the pixels from P(3, 1) to P(3, 3) is 0, and the density of yellow (Y) therein is 100. The reference regions are the four pixels on the upper, right, lower, and left sides of the target pixel.

In a case where the pixel P(4, 5) is the target pixel, the reference regions are a pixel P(4, 4), the pixel P(3, 5), a pixel P(5, 5), and the pixel P(4, 6). Since there is no pixel with a density of cyan (C) above the threshold of 50, no trapping process is performed on the target pixel P(4, 5).

Next, in a case where the pixel P(4, 6) is the target pixel, the reference regions are the pixel P(4, 5), the pixel P(3, 6), a pixel P(5, 6), and a pixel P(4, 7). The density of cyan (C) in the pixel P(3, 6) is 51 and is above the threshold of 50. Thus, trapping is ON. By performing a trapping process in this manner, a result as shown in FIG. 8B is obtained. FIG. 8B is an output result obtained by performing a trapping process according to the conventional method. No trapping process is done on the pixel P(4, 5) and a pixel P(5, 8) in FIG. 8B, so that the ON/OFF of the trapping is switched. Consequently, their densities become different from those of other peripheral pixels. The density differences are noticeable, thereby making edge portions unnatural. The above example shows that the ON/OFF of a trapping process is switched, thereby causing an image defect, in a case where trapping is performed on an image having densities around a threshold according to the conventional method. FIG. 8C is an example of the ideal trapping process result and shows that the edge in the image is smoothly connected.

SUMMARY OF THE INVENTION

An image processing apparatus according to the present invention is an image processing apparatus, comprising: an inputting unit configured to input image data including a first process color and a second process color; and a determining unit configured to determine a density of the second process color for a target pixel in the inputted image data on the basis of a density of the first process color in the target pixel and on a density of the second process color in a peripheral pixel of the target pixel. If a second density is higher than a first density, a density of the second process color for the target pixel determined by the determining unit in a case where a density of the first process color in the target pixel is the second density is higher than a density of the second process color for the target pixel determined by the determining unit in a case where a density of the first process color in the target pixel is the first density.

A natural and fine trapping result can be obtained from an image containing a gradation image or an image with varying densities.

Further features of the present invention will become apparent from the following description of exemplary embodiments (with reference to the attached drawings).

BRIEF DESCRIPTION OF THE DRAWINGS

FIG. 4 is a diagram showing the relationship of FIGS. 4A and 4B;

FIGS. 4A and 4B indicate a flowchart showing an example of a trap-rate determining process according to Embodiment 1 of the present invention;

FIGS. 6A to 6C are views for describing a trap-rate determining method according to an embodiment of the present invention;

DESCRIPTION OF THE EMBODIMENTS

Hereinbelow, embodiments of the present invention will be described with reference to the drawings.

<Embodiment 1>

Figure 1:
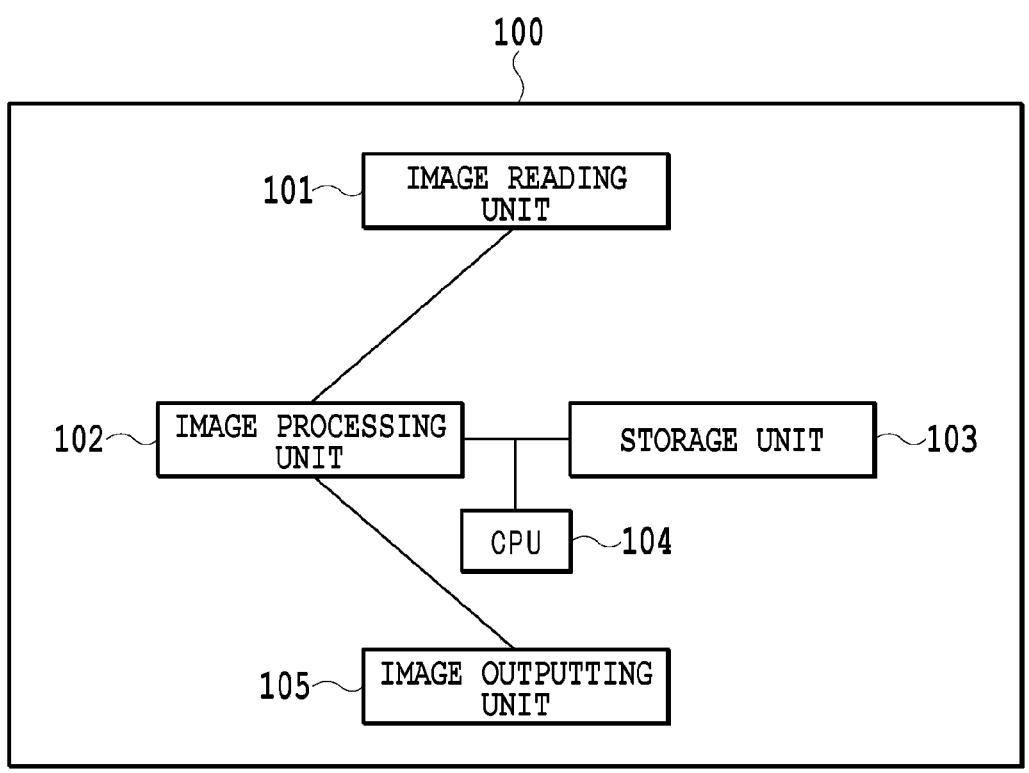
FIG. 1 is a block diagram showing an example of a schematic configuration of an image forming apparatus according to an embodiment of the present invention.

FIG. 1 is a block diagram showing an example of the configuration of an image forming apparatus 100 according to Embodiment 1. This embodiment will be described by assuming the image forming apparatus 100 as a digital multifunctional printer, for example. However, the present invention is applicable not only to multifunctional printers but also to other printing apparatuses including other color printers such as laser beam printers and inkjet printers. In other words, the present invention is applicable to any image forming apparatuses configured to form a color image by superimposing images based on pieces of image data of process colors.

First, the configuration of the image forming apparatus 100 according to this embodiment will be described. As shown in FIG. 1, the image forming apparatus 100 includes an image reading unit 101, an image processing unit 102, a storage unit 103, a CPU 104, and an image outputting unit 105. Note that the image forming apparatus is connectable to servers that manage image data, PCs (personal computers) that instruct the image forming apparatus to execute printing, and the like through a network such as a LAN or the Internet.

Next, the function of each component of the image forming apparatus shown in FIG. 1 will be described. The image reading unit 101 is configured to extract an input image. For example, the image reading unit 101 extracts a color image in CMYK (cyan, magenta, yellow, and black) which are process colors. The image processing unit 102 is configured to convert printing information sent from the image reading unit 101 or another apparatus into intermediate information (hereinafter, referred to as "object") and store it in an object buffer in the image processing unit 102. Image processing such as density correction or the like is performed in this step. Further, the image processing unit 102 is configured to create bitmap data based on the buffered object and store it in a band buffer therein. A dither process, a halftone process, or the like is performed in this step.

Meanwhile, there are two ways to perform a trapping process, in one of which a trapping process is performed on an object data basis, and in the other of which a trapping process is performed on a bitmap after rendering. This embodiment will be described based on an example where a trapping process is performed on a bitmap after rendering.

Next, the configurations and functions of the storage unit 103, the CPU 104, and the image outputting unit 105 of the image forming apparatus shown in FIG. 1 will be described. The storage unit 103 is formed of various storage media such as a RAM (random access memory) and a ROM (read-only memory). For example, the RAM is used as an area to store data and various pieces of information and used also as a work area. On the other hand, the ROM is used as an area to store various control programs. Moreover, the CPU 104 is used as a unit configured to determine and control various processes according to the programs stored in the ROM. Further, the image outputting unit 105 is configured to output an image (forming and outputting an image onto a recording medium such as a recording paper sheet, for example).

Figure 2:
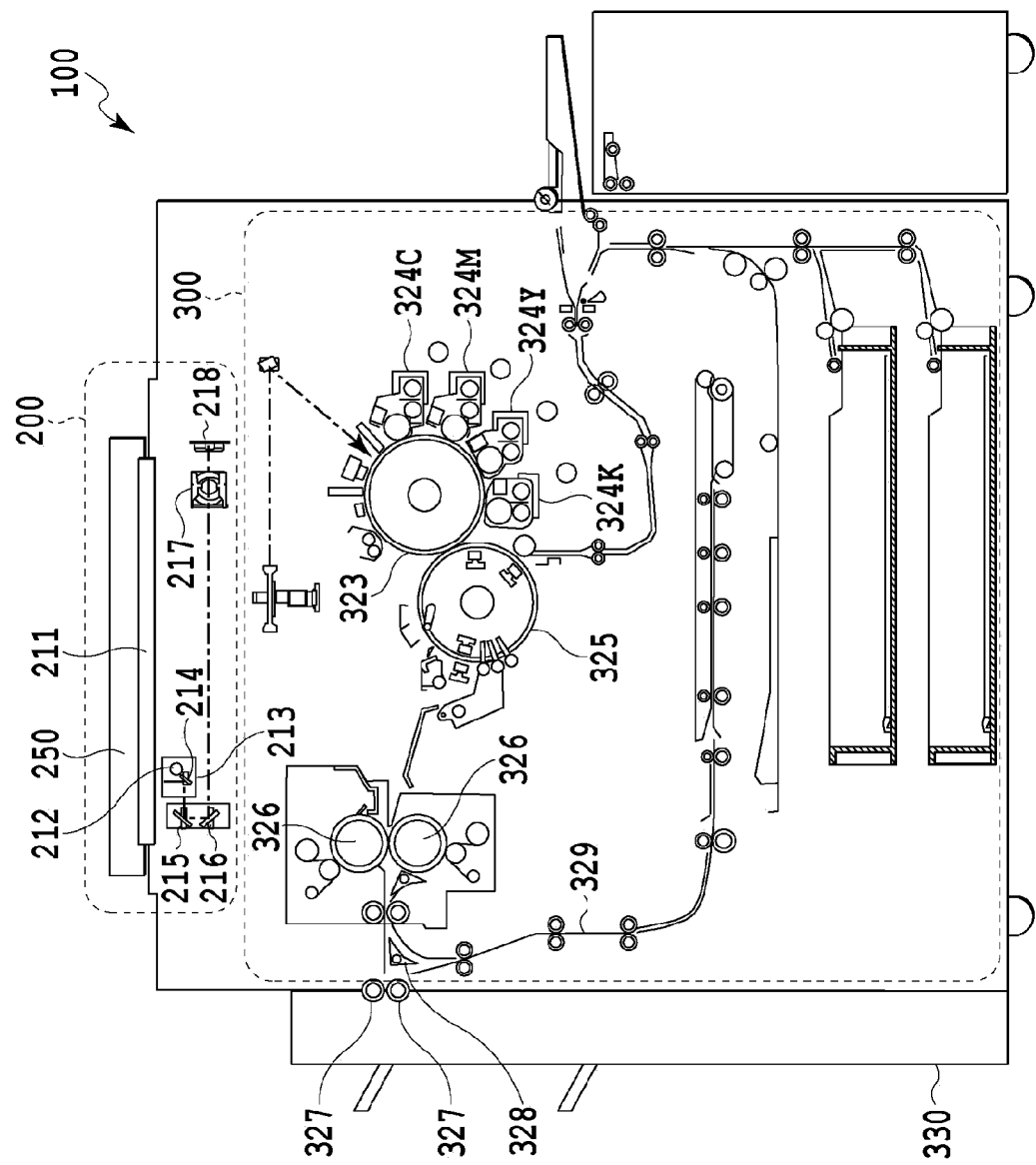
FIG. 2 is a view showing an example of the hardware configuration of an image forming apparatus according to an embodiment of the present invention.

Next, an example of the hardware configuration of the image forming apparatus 100 according to this embodiment will be described with reference to FIG. 2. As shown in FIG. 2, the image reading unit 101 and the image outputting unit 105 is configured integrally with each other as a scanner unit 200 and a printer unit 300, respectively. The scanner unit 200 is equipped with an original feeding unit 250. The original feeding unit 250 feeds originals individually from the uppermost one onto a platen glass 211. In the scanner unit 200, each time an original reading operation is finished, that original is discharged from the platen glass 211 onto an exit tray not shown.

In the scanner unit 200, when an original is fed onto the platen glass 211, a lamp 212 lights up and a moving unit 213 starts moving. With this movement of the moving unit 213, the scanner unit 200 scans the original on the platen glass 211. In this scanning, light reflected from the original is guided to a CCD image sensor (hereinafter, referred to as "CCD") 218 by mirrors 214, 215, and 216 and through a lens 217, and the image on the original is formed on the imaging surface of the CCD 218. The CCD 218 converts the image formed on its imaging surface into electric signals. These electric signals are processed in a predetermined manner and then inputted into the image processing unit 102.

On the other hand, in the printer unit 300, light such as laser light modulated according to image data inputted from the image processing unit 102 is caused to strike a rotary polygon mirror rotating at a constant angular velocity, to thereby apply the light onto a photosensitive drum 323 as reflected scan light.

The applied laser light forms an electrostatic latent image on the photosensitive drum 323 serving as an image carrier. This electrostatic latent image is visualized into a toner image (developed image) by toners supplied from developing devices 324C, 324M, 324Y, and 324K serving as developer containing units each containing a developer corresponding to one of the multiple color components. Specifically, an image is produced by executing a series of electrophotographic processes including: transferring a toner image formed on the photosensitive drum 323 onto a recording paper sheet serving as a recording medium; and collecting a small amount of the toner failing to be transferred and remaining on the photosensitive drum 323. Here, the developing devices 324C, 324M, 324Y, and 324K respectively containing cyan (C), magenta (M), yellow (Y), and black (K) toners execute the series of electrophotographic processes in turn while the recording paper sheet wound around a transferring part 325 in a predetermined position is rotated four times. By the time the recording paper sheet is rotated four times, a full color toner image with the four color components is transferred on the recording paper sheet.

The recording paper sheet on which the toner image is transferred is delivered by a conveying belt to a pair of fixing rollers (a heat roller and a pressure roller) 326. Then, the fixing rollers 326 heat and press the recording paper sheet to fix the toner image on the recording paper sheet to the recording paper sheet. The recording paper sheet after passing through the pair of fixing rollers 326 is discharged by a pair of sheet discharging rollers 327 to a sheet discharging unit 330.

The sheet discharging unit 330 is formed of a sheet processing apparatus capable of post processes such as sorting and stapling. Meanwhile, in a case where a two-sided recording mode is set, the rotating direction of the pair of sheet discharging rollers 327 is reversed after the recording paper sheet is conveyed to the pair of sheet discharging rollers 327, to thereby guide the recording paper sheet to a conveying path for re-feed 329 through a flapper 328. The recording paper sheet guided to the conveying path for re-feed 329 is fed again between the photosensitive drum 323 and the transferring part 325 at the timings mentioned above, so that a toner image is transferred onto the back surface of the recording paper sheet.

Next, the procedure of a trapping process will be described.

Figure 3:
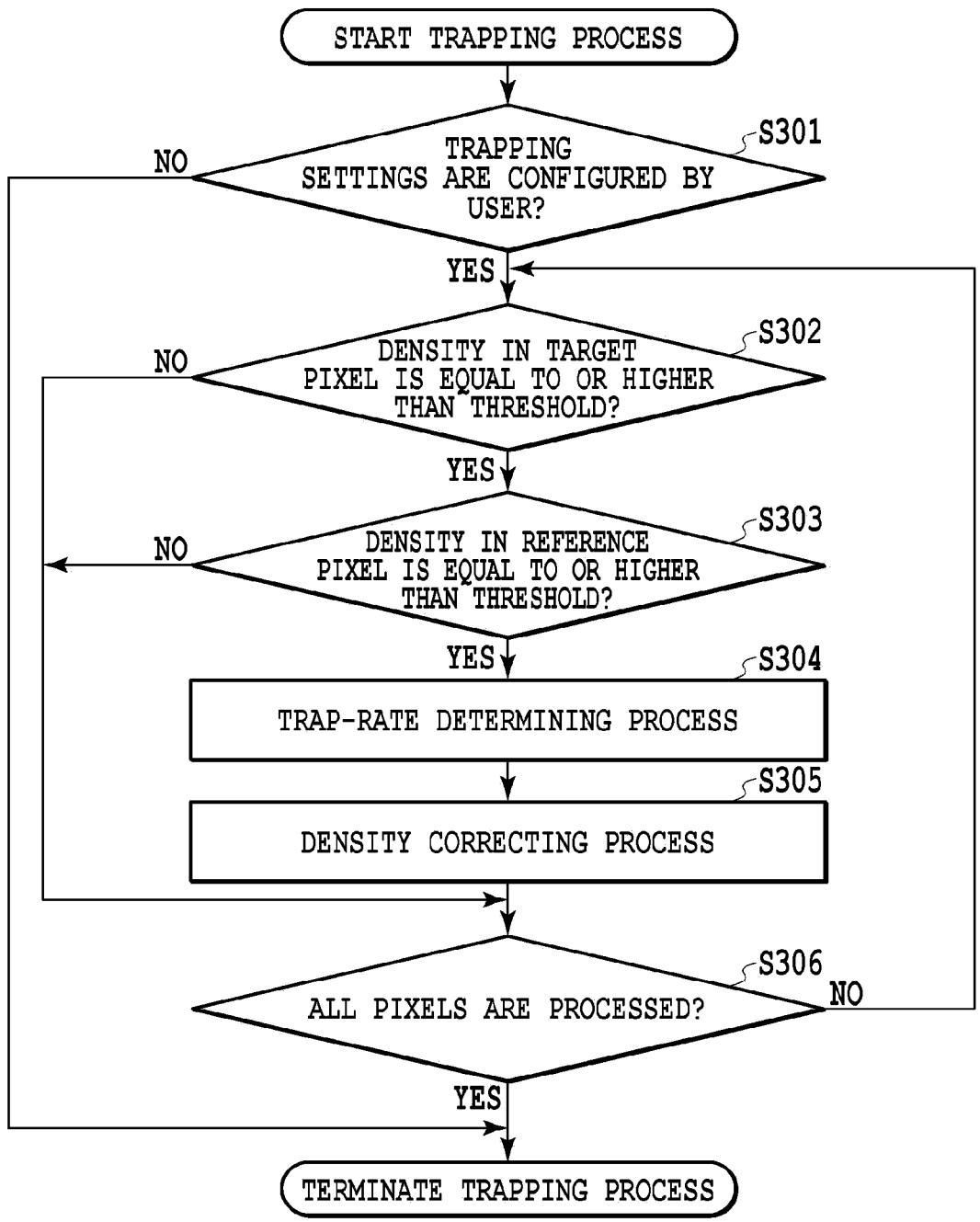
FIG. 3 is a flowchart showing an example of a trapping process according to Embodiment 1 of the present invention.

FIG. 3 is a flowchart for describing the procedure of a trapping process in the image forming apparatus 100 according to Embodiment 1. The trapping process is performed in the image processing unit 102 under control of the CPU 104 according to the programs stored in the storage unit 103.

First, in step S301, the CPU 104 determines whether or not a trapping process is set to be executed on image data (bitmap data) inputted to the image processing unit 102. For example, the user performs test printing. In a case where it is determined from the printing result that misregistration is occurring, the user inputs an instruction to an image forming apparatus to perform a trapping process. The image forming apparatus configures trapping settings based on that instruction. The trapping settings include settings for the trap color (i.e. the process color to be expanded to the adjacent pixel), for example. Moreover, settings for the pixels to be used as reference regions may also be configured. Furthermore, settings that indicate the direction of trapping may also be configured. These settings are inputted from a UI unit not shown and are held in the storage unit 103. The trapping process is terminated in a case where the result of the determination in step S301 shows that the trapping settings are OFF. On the other hand, in a case where the trapping settings are ON, the image processing unit 102 obtains the trap color settings including the designated trap color and performs the following operations on each pixel individually.

In step S302, the image processing unit 102 determines whether or not the density of a process color in the target pixel other than the trap color obtained in step S301 is equal to or higher than a threshold. As will be described later, in a case where the density of the process color in the target pixel other than the trap color is lower than the threshold, no trapping process is performed on the target pixel because even if misregistration occurs, the misregistration would be made unnoticeable by the target pixel. The process then proceeds to step S306. The process proceeds to step S303 in a case where the density of the process color in the target pixel other than the trap color is equal to or higher than the threshold.

In step S303, the image processing unit 102 determines whether or not the density of the trap color, obtained in step S301, in any of the reference pixels set as reference regions is equal to or higher than a threshold. In a case where the density of the trap color in any reference pixel is lower than the threshold, no trapping process is performed on the target pixel because even if misregistration occurs, the misregistration would be made unnoticeable by the target pixel. The process then proceeds to step S306. The process proceeds to a trap-rate determining process in step S304 in a case where the density of the trap color in any reference pixel is equal to or higher than the threshold.

Figure 7A:
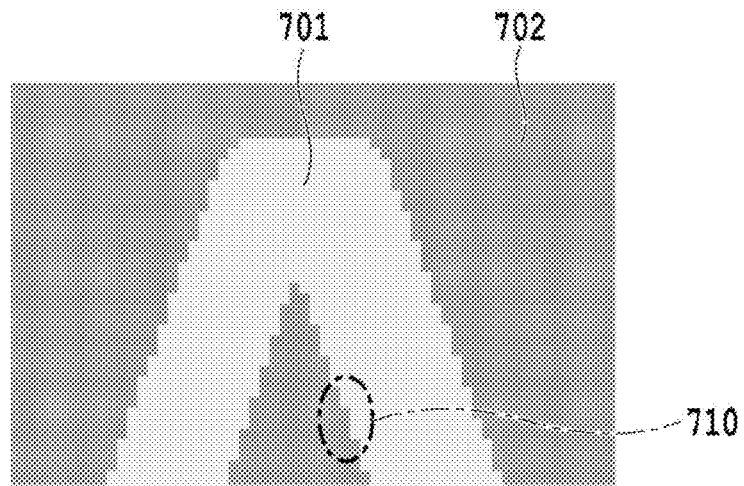
FIGS. 7A to 7C are views for describing the problem of a conventional trapping process.
Figure 7B:
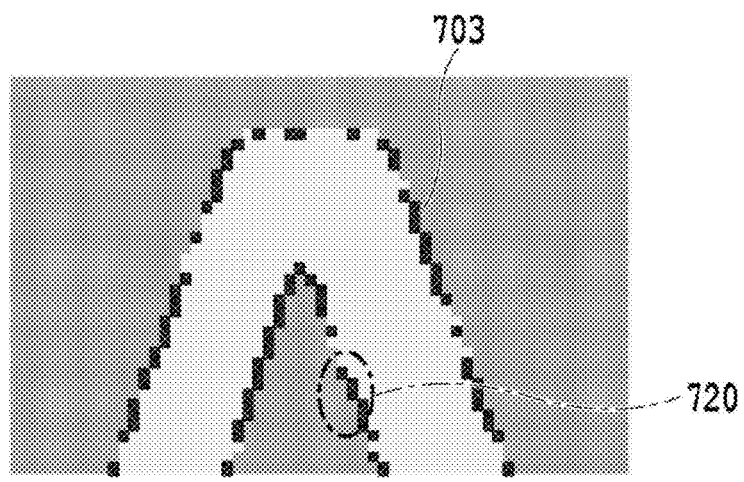
Figure 7C:
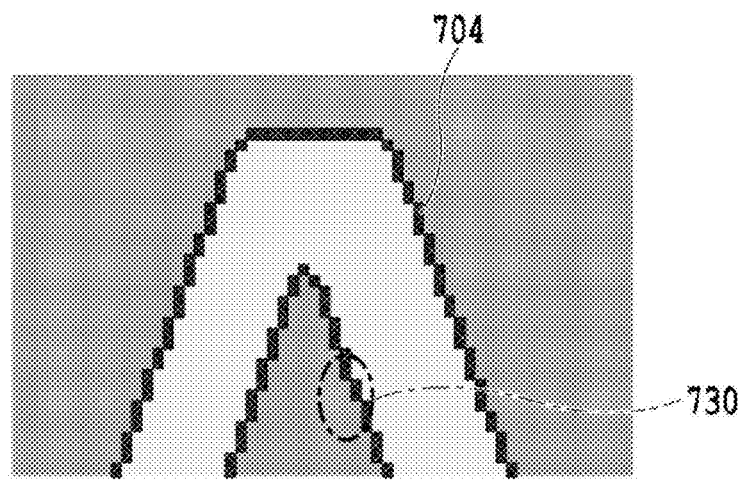
Figure 8A:
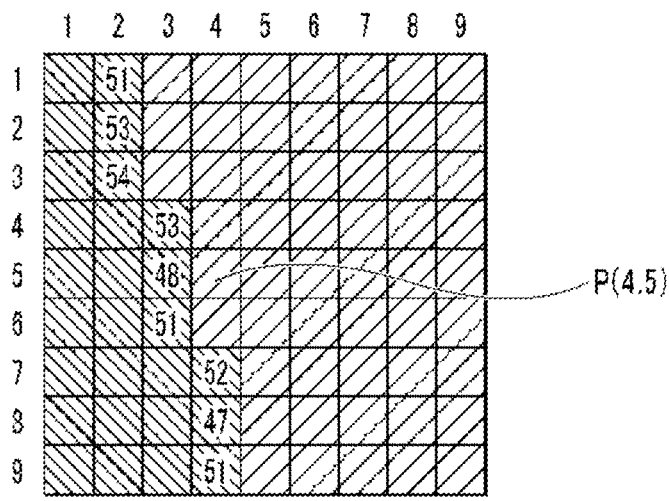
FIGS. 8A to 8C are enlarged views of part of FIGS. 7A to 7C, respectively.
Figure 8B:
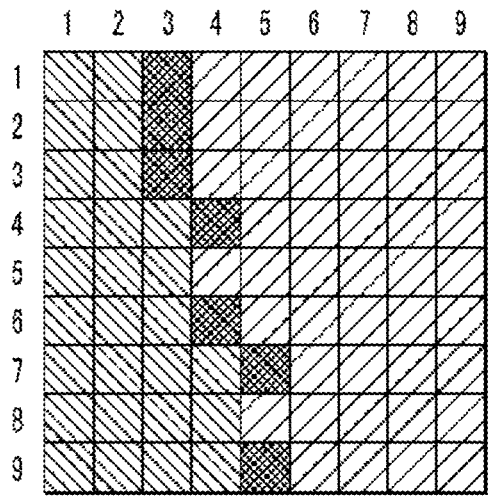
Figure 8C:
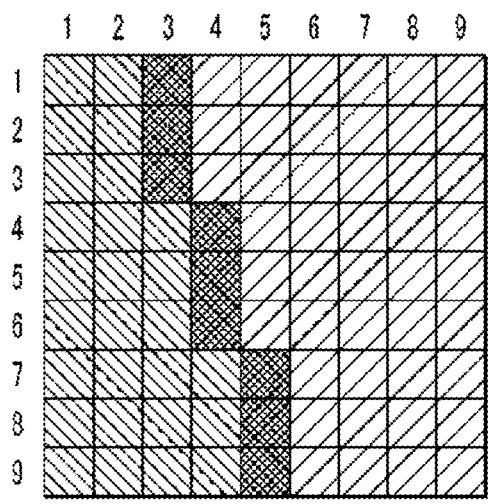

Note that this embodiment involves operations of determining a trap rate in a manner described later and correcting the trap color according to the trap rate. Thus, the thresholds in steps S302 and S303 can be set lower than, for example, the threshold used in the foregoing example described with reference to FIGS. 7 and 8. In other words, the thresholds in steps S302 and S303 may be set to such values that the process can easily proceed to step S304 to be described later. Moreover, these thresholds may be the same value or different values. Here, the trap rate refers to the value of a change rate used to determine the degree of the density of the trap color for the target pixel with respect to the density of the trap color in the reference pixel.

In step S304, the image processing unit 102 performs the trap-rate determining process for calculating the trap rate from the density values of the target pixel and the reference pixel. Note that there may be multiple reference pixels above the threshold in step S303. In this case, the pixel with the highest density among the pixels above the threshold can be used as the reference pixel used in step S304 (i.e. a pixel described as the reference pixel in the trap-rate determining process to be discussed later). Details of the trap-rate determining process in step S304 will be described later.

In step S305, the image processing unit 102 performs a density correcting process for correcting the target pixel based on the trap color of the reference pixel used in step S304 and the trap rate determined in step S304. In other words, the image processing unit 102 performs a process in which the trap color with a density corresponding to the trap rate is set as the trap color for the target pixel. The value of the target pixel is derived from the following equation.

Density Value of Trap Color for Target Pixel=cpix×Rate, where cpix is the density value of the trap color in the reference pixel, and Rate is the trap rate. In other words, the density value of the trap color for the target pixel is determined based on the density value of the trap color in the reference pixel and the trap rate determined from the density values of the target pixel and the reference pixel.

However, in a case where Rate=0 in step S305, it means that no trapping is performed. In this case, the density value of the trap color in the target pixel is outputted as is without changing it (no trapping is performed).

In step S306, the image processing unit 102 determines whether or not all the pixels in the inputted image are processed. In a case where there is a next pixel, the next pixel is set as the target pixel, and the process proceeds to step S302. The trapping process is terminated in a case where all the pixels are determined to be processed.

Next, before describing specific processing, a case where a trapping process is necessary will be described. To perform a natural trapping process, determination needs to be done comprehensively based on four types of density. Otherwise, a natural trapping result cannot be obtained. The four types of density include: the density of the trap color in the target pixel; the density of a color in the target pixel other than the trap color; the density of the trap color in a reference pixel; and the density of the color in the reference pixel other than the trap color. This will be specifically described with reference to FIGS. 10A and 10B.

Figure 10A:
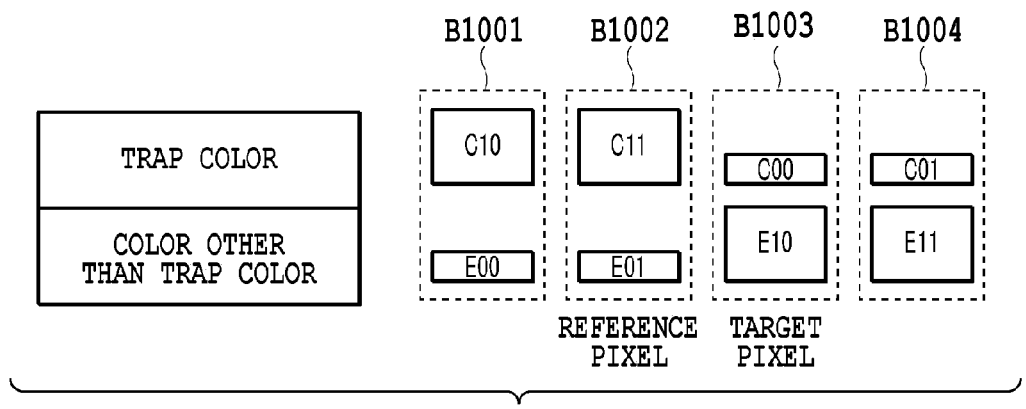
FIGS. 10A and 10B are diagrams for describing a trapping process according to an embodiment of the present invention.
Figure 10B:
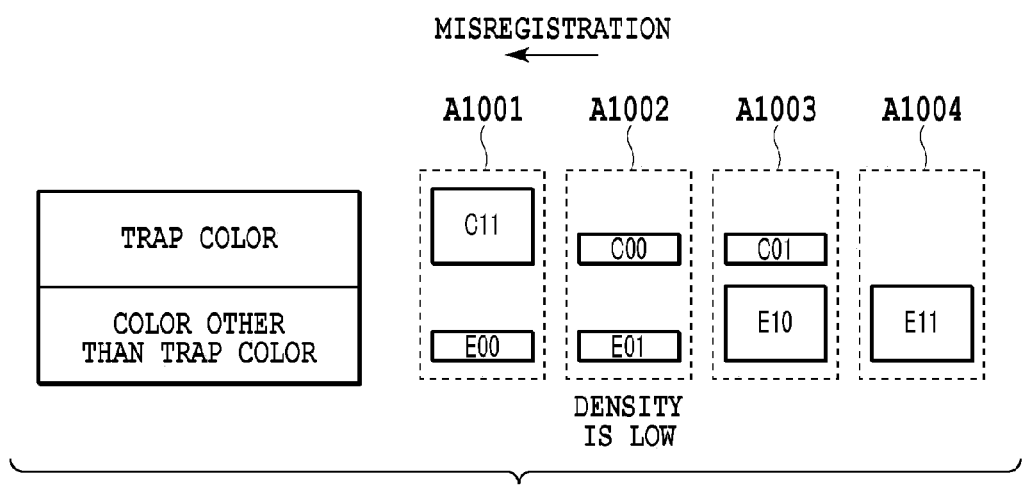

FIGS. 10A and 10B are diagrams for describing a case where a trapping process is necessary. Pixels are arranged side by side. The upper section indicates the trap color (i.e. the process color to be expanded) while the lower section indicates the process color other than the trap color. The size of each rectangle represents the density value. C10, C11, E10, and E11 have high density. C00, C01 E00, and E01 have low density. FIG. 10A is an image before the process is performed in the image processing unit 102. FIG. 10B is an image showing a case where the trap color is shifted to the left by one pixel due to misregistration. The density of a target pixel B1003 is the sum of the density C00 and the density E10. The density of a reference pixel B1002 is the sum of the density C11 and E01. Pixels B1001 to B1004 in FIG. 10A and pixels A1001 to A1004 in FIG. 10B are pixels at the same corresponding positions.

A trapping process is necessary in a case where the density of the trap color in the target pixel is low, the density of the color in the target pixel other than the trap color is high, the density of the trap color in any reference pixel is high, and the density of the color in the reference pixel other than the trap color is low. As shown in FIG. 10B, in a case where the trap color is shifted to the left by one pixel due to misregistration, the density in the pixel A1002 becomes lower than those in the peripheral pixels A1001 and A1003. In this case, since the density in the pixel A1002 is lower than those in the peripheral areas, the pixel A1002 may possibly appear light and thus appear like a white space. For this reason, a trapping process is necessary in the case where the density of the trap color in the target pixel is low, the density of the color in the target pixel other than the trap color is high, the density of the trap color in any reference pixel is high, and the density of the color in the reference pixel other than the trap color is low.

In this embodiment, to determine the presence of the above condition, trap rates Rate1, Rate2, Rate3, and Rate4 calculated from the densities in the above pixels are used. Rate1 is a trap rate calculated from the density of the trap color in the target pixel. Rate2 is a trap rate calculated from the density of the process color in the target pixel other than the trap color. Rate3 is a trap rate calculated from the density of the trap color in the reference pixel. Rate4 is a trap rate calculated from the density of the process color in the reference pixel other than the trap color.

Moreover, in this embodiment, the density of the trap color is controlled stepwise according to the densities of the colors in the above pixels (the four types of density). In this way, a natural trapping result can be obtained regardless of the degrees of the densities of the colors in the pixels.

FIGS. 6A to 6C are views for describing methods of determining the trap rate. FIG. 6A is an input image before a trapping process. FIG. 6B is an output result obtained by performing a trapping process according to the conventional method. FIG. 6C is an output result obtained by performing a trapping process according to this embodiment. Each of "a" to "r" in FIGS. 6A to 6C denotes a group of pixels with the same densities within a given area. The densities of each pixel group are as follows.

a: C=153, M=26, Y=0, K=0
b: C=102, M=102, Y=0, K=0
c: C=153, M=102, Y=0, K=0
d: C=26, M=153, Y=0, K=0
e: C=26, M=102, Y=0, K=0
f: C=26, M=153, Y=0, K=0
g: C=153, M=26, Y=0, K=0
h: C=102, M=26, Y=0, K=0
i: C=153, M=102, Y=0, K=0
j: C=153, M=153, Y=0, K=0

Moreover, each of pixels 601 to 615 is a pixel in one of the pixel groups.

Figure 4B:
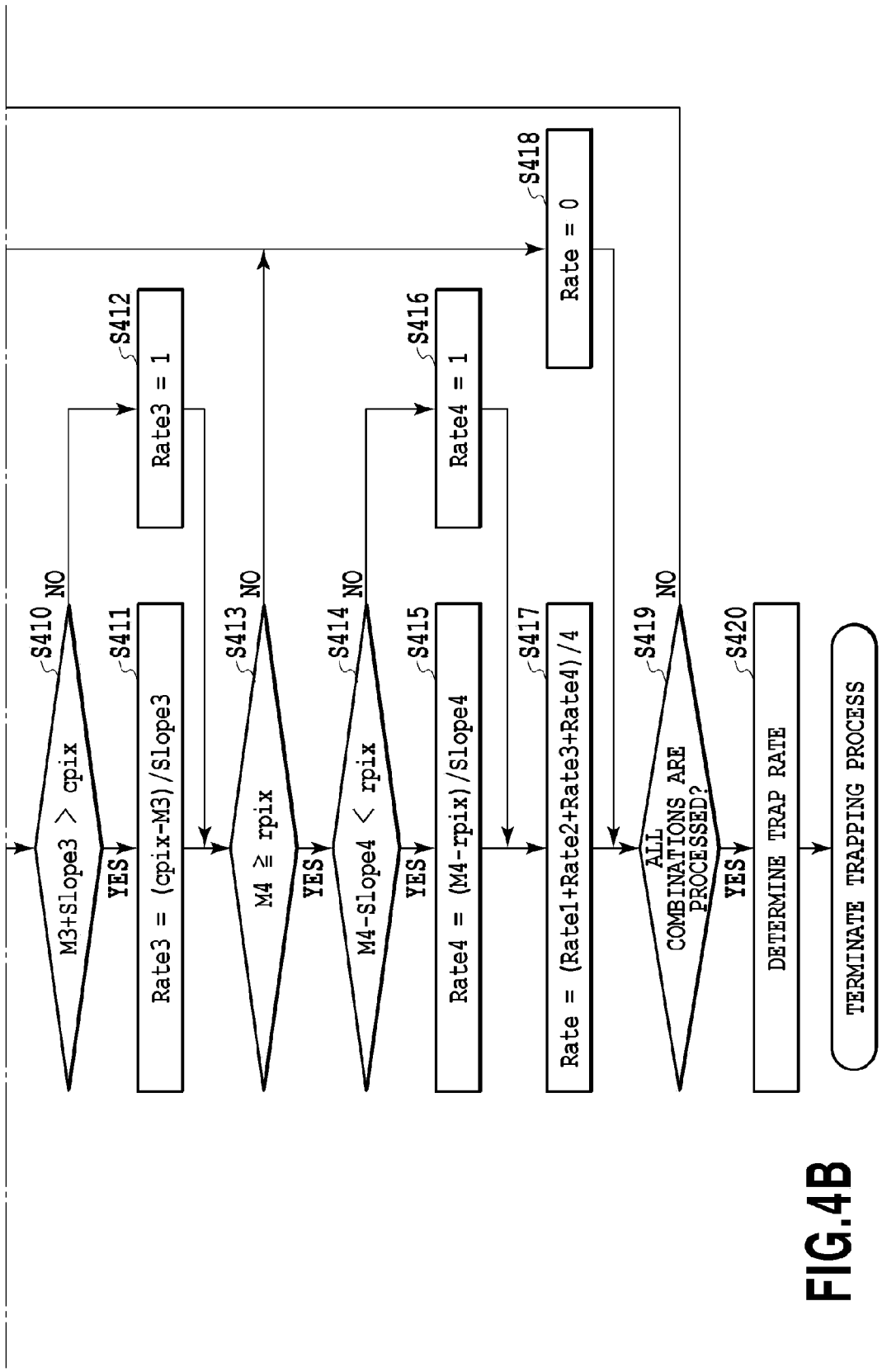

Next, a flowchart in FIGS. 4A and 4B will be described with reference to FIGS. 5A to 5D and FIGS. 6A to 6C. FIGS. 4A and 4B indicate a flowchart showing the flow of the trap-rate determining process. FIGS. 5A to 5D are graphs for describing processing examples. Note that the following will describe a case where cyan (C) is set as the trap color. Moreover, the process colors other than the trap color are yellow (Y), magenta (M), and black (K).

rm_cpix denotes the density of the trap color in the target pixel. rm_rpix denotes the density of a process color in the target pixel other than the trap color. cpix denotes the density of the trap color in the reference pixel. rpix denotes the density of the process color in the reference pixel other than the trap color. Thresholds M1, M2, M3, and M4 can be set to any values. In this embodiment, M1, M2, M3, and M4 are 204, 51, 51, and 204, respectively. Slope1, Slope2, Slope3, and Slope4 each denote a range for adjustment of a trap rate and are all 128. The trap rate can be controlled stepwise within this trap-rate adjustment range. Rate1 denotes a trap rate calculated from the density of the trap color in the target pixel. Rate2 denotes a trap rate calculated from the density of the color in the target pixel other than the trap color. Rate3 denotes a trap rate calculated from the density of the trap color in the reference pixel. Rate4 denotes a trap rate calculated from the density of the color in the reference pixel other than the trap color. Moreover, Rate denotes a final trap rate. Furthermore, the density in each pixel is an 8-bit (0 to 255) value. The threshold values and the bit number are merely examples, and the present invention is not limited to these.

In the following description, the color other than the trap color means one of the process colors other than the trap color. The following operations in step S401 to S418 are executed repeatedly for all the combinations of the trap color and all the process colors other than the trap color.

In step S401, the image processing unit 102 determines whether or not the trap color rm_cpix in the target pixel is equal to or lower than the threshold M1. In a case where the trap color in the target pixel is higher than the threshold M1, the density of the trap color in the target pixel is sufficiently high. In this case, the image processing unit 102 determines that no trapping is necessary because even if misregistration occurs, the misregistration would not be noticeable, and the process proceeds to step S418. In a case where the trap color in the target pixel is equal to or lower than the threshold M1, trapping may be necessary, and thus the process proceeds to step S402.

For example, in a case where the pixel 601 in FIG. 6A is the target pixel and the pixel 602 in FIG. 6A is the reference pixel, the trap color rm_cpix in the target pixel is 102 and lower than the threshold M1 which is 204, and thus the process proceeds to step S402.

In step S402, the image processing unit 102 determines whether or not the trap color rm_cpix in the target pixel is higher than the value obtained by subtracting Slope1 from the threshold M1. In a case where rm_cpix is higher than (M1−Slope1), it means being within the adjustment range, and thus the process proceeds to step S403 to adjust the trap rate. In a case where rm_cpix is equal to or lower than (M1−Slope1), the image processing unit 102 performs no adjustment and the process proceeds to step S404, where the image processing unit 102 assigns 1 to Rate1 and the process proceeds to step S405.

In step S403, the image processing unit 102 calculates Rate1 from the following equation.

$$\text{Rate1} = (M1 - rm\_cpix)/\text{Slope1}$$

For example, in a case where the pixel 601 in FIG. 6A is the target pixel and the pixel 602 in FIG. 6A is the reference pixel, the trap color rm_cpix in the target pixel is 102. Therefore, $$\text{Rate1} = (204 - 102)/128$$
$$\approx 0.80$$

For example, in a case where the pixel 603 in FIG. 6A is the target pixel and the pixel 604 in FIG. 6A is the reference pixel, the trap color rm_cpix of the target pixel is 153. Therefore, $$\text{Rate1} = (204 - 153)/128$$
$$\approx 0.40$$

Figure 5A:
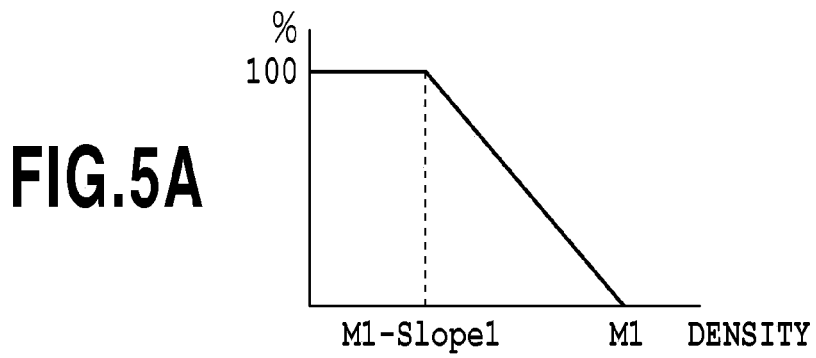
FIGS. 5A to 5D are graphs for describing a trap-rate determining method according to an embodiment of the present invention.

FIG. 5A is a graph showing a method of deriving Rate1. The lower the density of the trap color rm_cpix in the target pixel, the higher the need for a trapping process becomes. Thus, as shown in FIG. 5A, the lower the density of the trap color rm_cpix in the target pixel, the higher Rate1 becomes. FIG. 5A shows that Rate1 changes gradually in a stepwise manner or in a continuous manner in a case where the trap color rm_cpix in the target pixel is between M1 and (M1−Slope1). In the conventional method, the ON/OFF of trapping is switched at (M1−Slope1), and control is not performed in such a way as to gradually change the intensity of trapping. For this reason, in a case where the threshold for trapping in the conventional method is 128, a trapping process is performed only on the pixel group b in FIG. 6A since the trap color rm_cpix in each target pixel in the pixel group b is 102 and the trap color rm_cpix in each target pixel in the pixel group c is 153. A pixel group k in FIG. 6B is the result of the trapping of the pixel group a with respect to the pixel group b. FIG. 6B shows that no trapping is performed on the pixel group c since the trap color rm_cpix therein is higher than the threshold. In contrast, FIG. 6C is the processing result obtained by performing trapping according to the method of this embodiment. A trapping process is performed on the pixel group k and a pixel group o by using a Rate1 of 0.8 and a Rate1 of 0.4, respectively. It should be noted that the trapping process is performed based, to be precise, on Rate in step S420 to be described later. However, in this section, the trapping process is described as a process based on Rate1 for the sake of explanation. The same applies to Rate2, Rate3, and Rate4 to be described later. In FIG. 6B, trapping is performed only on the pixel group b, and there is thus a density difference at the boundary of the pixel group k and the pixel group c. In contrast, a trapping process is performed on the pixel group b and the pixel group c in FIG. 6C as shown by the pixel group k and the pixel group o, and it can be seen that the density difference is reduced.

Then, in step S405, the image processing unit 102 determines whether or not the color rm_rpix in the target pixel other than the trap color is equal to or higher than the threshold M2. In a case where the color rm_rpix in the target pixel other than the trap color is lower than the threshold M2, the image processing unit 102 determines that no trapping is necessary because even if misregistration occurs, the misregistration would not be noticeable, and the process proceeds to step S418. In a case where the color rm_rpix in the target pixel other than the trap color is equal to or higher than the threshold M2, misregistration would be noticeable, and thus the process proceeds to step S406.

In step S406, the image processing unit 102 determines whether or not the color rm_rpix in the target pixel other than the trap color is lower than the sum of the threshold M2 and Slope2. In a case where rm_rpix is lower than (M2+Slope2), it means being within the adjustment range, and thus the process proceeds to step S407 to adjust the trap rate. In a case where rm_rpix is equal to or higher than (M2+Slope2), the image processing unit 102 performs no adjustment and the process proceeds to step S408, where the image processing unit 102 assigns 1 to Rate2 and the process proceeds to step S409.

In step S407, the image processing unit 102 derives Rate2 from the following equation.

$$\text{Rate2} = (rm\_rpix - M2)/\text{Slope2}$$

For example, in a case where the pixel 605 in FIG. 6A is the target pixel and the pixel 606 in FIG. 6A is the reference pixel, the color rm_rpix in the target pixel other than the trap color is 153. Therefore, $$\text{Rate2} = (153 - 51)/128$$
$$\approx 0.80$$

For example, in a case where the pixel 603 in FIG. 6A is the target pixel and the pixel 604 in FIG. 6A is the reference pixel, the color rm_rpix in the target pixel other than the trap color is 102. Therefore, $$\text{Rate2} = (102 - 51)/128$$
$$\approx 0.40$$

Figure 5B:
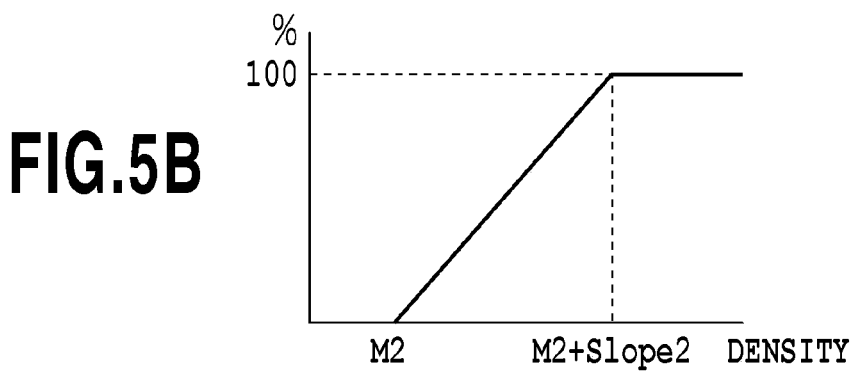

FIG. 5B is a graph showing a method of deriving Rate2. The higher the density of the color rm_rpix in the target pixel other than the trap color, the higher the need for a trapping process becomes. Thus, as shown in FIG. 5B, the higher the density of the color rm_rpix in the target pixel other than the trap color, the higher Rate2 becomes. FIG. 5B shows that Rate2 changes gradually in a stepwise manner or in a continuous manner in a case where the color rm_rpix in the target pixel other than the trap color is between the threshold M2 and (M2+Slope2). In the conventional method, the ON/OFF of trapping is switched at (M2+Slope2), and control is not performed in such a way as to gradually change the intensity of trapping. For this reason, in a case where the threshold for trapping in the conventional method is 128, a trapping process is performed only on the pixel group d since the color rm_rpix in each target pixel other than the trap color in the pixel group d is 153 and the color rm_rpix in each target pixel other than the trap color in the pixel group e is 102. A pixel group l in FIG. 6B is the result of the trapping of the pixel group a with respect to the pixel group d. FIG. 6B shows that no trapping is performed on the pixel group e since the color rm_rpix therein is lower than the threshold. In contrast, FIG. 6C is the processing result obtained by performing trapping according to the method of this embodiment. A trapping process is performed on the pixel group l and a pixel group p by using a Rate2 of 0.8 and a Rate2 of 0.4, respectively. In FIG. 6B, trapping is performed only on the pixel group d, and there is thus a density difference at the boundary of the pixel group l and the pixel group e. In contrast, trapping is performed on the pixel group d and the pixel group e in FIG. 6C as shown by the pixel group l and the pixel group p, and it can be seen that the density difference is reduced.

Then, in step S409, the image processing unit 102 determines whether or not the trap color cpix in the reference pixel is equal to or higher than the threshold M3. In a case where the trap color cpix in the reference pixel is lower than the threshold M3, the image processing unit 102 determines that no trapping is necessary because even if misregistration occurs, the misregistration would not be noticeable, and the process proceeds to step S418. In a case where the trap color cpix in the reference pixel is equal to or higher than the threshold M3, misregistration would be noticeable, and thus the process proceeds to step S410.

In step S410, the image processing unit 102 determines whether or not the trap color cpix in the reference pixel is lower than the sum of the threshold M3 and Slope3. In a case where cpix is lower than (M3+Slope3), it means being within the adjustment range, and thus the process proceeds to step S411 to adjust the trap rate. In a case where cpix is equal to or higher than (M3+Slope3), the image processing unit 102 performs no adjustment and the process proceeds to step S412, where the image processing unit 102 assigns 1 to Rate3 and the process proceeds to step S413.

In step S411, the image processing unit 102 derives Rate3 from the following equation.

$$\text{Rate3} = (cpix - M3)/\text{Slope3}$$

For example, in a case where the pixel 609 in FIG. 6A is the target pixel and the pixel 610 in FIG. 6A is the reference pixel, the trap color cpix of the reference pixel is 153. Therefore, $$\text{Rate3} = (153 - 51)/128$$
$$\approx 0.80$$

For example, in a case where the pixel 611 in FIG. 6A is the target pixel and the pixel 612 in FIG. 6A is the reference pixel, the trap color cpix of the reference pixel is 102. Therefore, $$\text{Rate3} = (102 - 51)/128$$
$$\approx 0.40$$

Figure 5C:
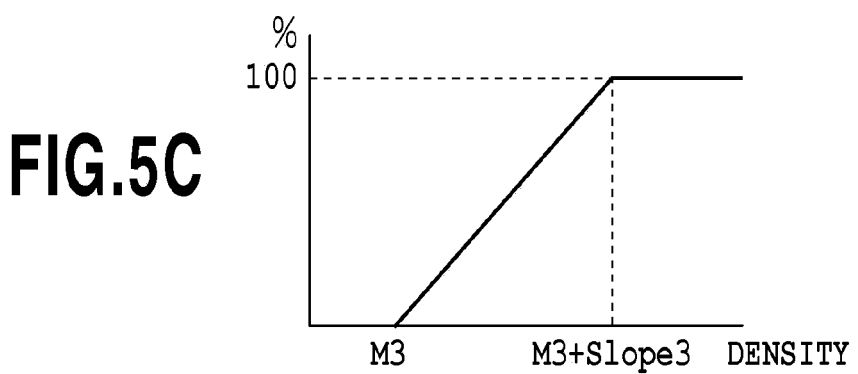

FIG. 5C is a graph showing a method of deriving Rate3. The higher the density cpix of the trap color in the reference pixel, the higher the need for a trapping process becomes. Thus, as shown in FIG. 5C, the higher the density cpix of the trap color in the reference pixel, the higher Rate3 becomes. FIG. 5C shows that Rate3 changes gradually in a stepwise manner or in a continuous manner in a case where the trap color cpix in the reference pixel is between the threshold M3 and (M3+Slope3). In the conventional method, the ON/OFF of trapping is switched at (M3+Slope3), and control is not performed in such a way as to gradually change the intensity of trapping. For this reason, in a case where the threshold for trapping in the conventional method is 128, a trapping process is performed only from the pixel group g in FIG. 6A since the trap color cpix in each reference pixel in the pixel group g is 153 and the trap color cpix in each reference pixel in the pixel group h is 102. A pixel group m in FIG. 6B is the result of the trapping of the pixel group g with respect to the pixel group f. FIG. 6B shows that no trapping is performed from the pixel group h since the color cpix therein is lower than the threshold. In contrast, FIG. 6C is the processing result obtained by performing trapping according to the method of this embodiment. A trapping process is performed on the pixel group m and a pixel group q by using a Rate3 of 0.8 and a Rate3 of 0.4, respectively. In FIG. 6B, trapping is performed only from the pixel group g to the pixel group f, and there is thus a density difference at the boundary of the pixel groups m and h. In contrast, a trapping process is performed on the pixel group f in FIG. 6C as shown by the pixel group m and the pixel group q, and it can be seen that the density difference is reduced.

Then, in step S413, the image processing unit 102 determines whether or not the color rpix in the reference pixel other than the trap color is equal to or lower than the threshold M4. In a case where the color rpix in the reference pixel other than the trap color is higher than the threshold M4, the image processing unit 102 determines that no trapping is necessary because even if misregistration occurs, the misregistration would not be noticeable, and the process proceeds to step S418. In a case where the color rpix in the reference pixel other than the trap color is equal to or lower than the threshold M4, trapping may be necessary, and thus the process proceeds to step S414.

In step S414, the image processing unit 102 determines whether or not the color rpix in the reference pixel other than the trap color is higher than the value obtained by subtracting Slope4 from the threshold M4. In a case where rpix is higher than (M4−Slope4), it means being within the adjustment range, and thus the process proceeds to step S415 to adjust the trap rate. In a case where rpix is equal to or lower than (M4−Slope4), the image processing unit 102 performs no adjustment and the process proceeds to step S416, where the image processing unit 102 assigns 1 to Rate4 and the process proceeds to step S417.

In step S416, the image processing unit 102 derives Rate4 from the following equation.

$$\text{Rate4} = (M4 - rpix)/Slope4$$

For example, in a case where the pixel 613 in FIG. 6A is the target pixel and the pixel 614 in FIG. 6A is the reference pixel, the color rpix in the reference pixel other than the trap color is 102. Therefore, $$\text{Rate4} = (204 - 102)/128$$
$$\approx 0.80$$

For example, in a case where the pixel 615 in FIG. 6A is the target pixel and the pixel 616 in FIG. 6A is the reference pixel, the color rpix in the reference pixel other than the trap color is 153. Therefore, $$\text{Rate4} = (204 - 153)/128$$
$$\approx 0.40$$

Figure 5D:
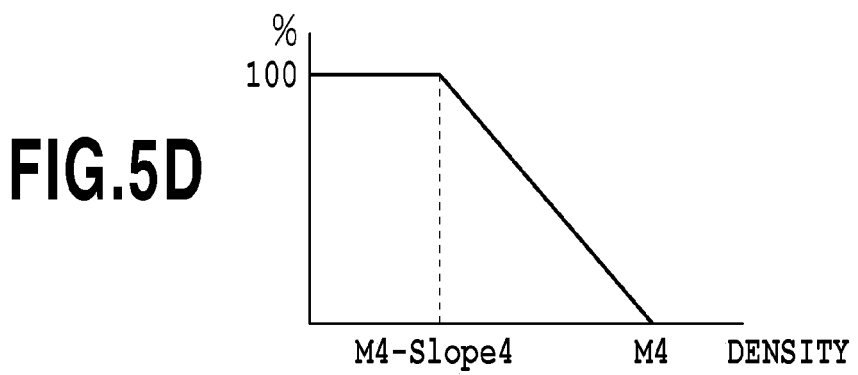

FIG. 5D is a graph showing a method of deriving Rate4. The lower the density of the color rpix in the reference pixel other than the trap color, the higher the need for a trapping process becomes. Thus, as shown in FIG. 5D, the lower the density of the color rpix in the reference pixel other than the trap color, the higher Rate4 becomes. FIG. 5D shows that Rate4 changes gradually in a stepwise manner or in a continuous manner in a case where the color rpix in the reference pixel other than the trap color is between the threshold M4 and (M4−Slope4). In the conventional method, the ON/OFF of trapping is switched at (M4−Slope4), and control is not performed in such a way as to gradually change the intensity of trapping. For this reason, in a case where the threshold for trapping in the conventional method is 128, a trapping process is performed only from the pixel group i in FIG. 6A since the color rpix in each reference pixel other than the trap color in the pixel group i is 102 and the color rpix in each reference pixel other than the trap color in the pixel group j is 153. A pixel group n in FIG. 6B is the result of the trapping of the pixel group i with respect to the pixel group f. FIG. 6B shows that no trapping is performed from the pixel group j since the color rpix therein is higher than the threshold. In contrast, FIG. 6C is the processing result obtained by performing trapping according to the method of this embodiment. A trapping process is performed on the pixel group n and a pixel group r by using a Rate4 of 0.8 and a Rate4 of 0.4, respectively. In FIG. 6B, trapping is performed only from the pixel group i to the pixel group f, and there is thus a density difference at the boundary of the pixel group n and the pixel group j. In contrast, a trapping process is performed on the pixel group f in FIG. 6C as shown by the pixel group n and the pixel group r, and it can be seen that the density difference is reduced.

In step S418, the image processing unit 102 assigns 0 to the trap rate Rate in a case where the image processing unit 102 determines in any one of steps S401, S405, S409, and S413 that no trapping is necessary.

In step S417, the image processing unit 102 determines the final trap rate Rate from the following equation by using the trap rates Rate1, Rate2, Rate3, and Rate4 of the corresponding types of density.

$$\text{Rate} = (\text{Rate1} + \text{Rate2} + \text{Rate3} + \text{Rate4})/4$$

For example, in a case where the pixel 601 in FIG. 6A is the target pixel and the pixel 602 in FIG. 6A is the reference pixel, the trap rate for each color of each pixel is as follows.
Rate1=(204−102)/128≈0.8
Rate2=(102−51)/128≈0.4
Rate3=(153−51)/128≈0.8
Rate4 is 1 because the color rpix in the reference pixel other than the trap color is 26 which is lower than (M4−Slope4=76)
From the above, $$\text{Rate} = (0.8 + 0.4 + 0.8 + 1)/4$$
$$= 0.75$$

The image processing unit 102 stores the trap rate determined in step S417 or S418 as the trap rate for the combination of the trap color and the process color other than the trap color which is the current processing target. Then, the process proceeds to step S419.

In step S419, the image processing unit 102 determines whether or not the operations in steps S401 to S418 are executed for all the combinations of the trap color and the other process colors. In a case where the operations are executed for all the combinations, the process proceeds to step S420. On the other hand, in a case where the operations are not yet executed for all the combinations, the image processing unit 102 changes the processing-target color other than the trap color to a process color other than the trap color which is not yet processed. The process then proceeds to step S401.

In step S420, the image processing unit 102 obtains the greatest trap rate among the trap rates for the combinations of the trap color and the process colors other than the trap color stored in step S417 and/or step S418. Moreover, the image processing unit 102 determines the obtained trap rate as the final trap rate Rate for the trap color.

Thus, the density of the trap color, or cyan, for the pixel group k is derived in step S305 as follows by using the trap color cpix in the reference pixel and the trap rate Rate thus determined.

$$\text{cpix} \times \text{Rate} = 153 \times 0.75 = 115$$

As mentioned above, a trapping process is necessary in a case where the density of the trap color in the target pixel is low, the density of a color in the target pixel other than the trap color is high, the density of the trap color in any reference pixel is high, and the density of the color in the reference pixel other than the trap color is low. The trap rates Rate1, Rate2, Rate3, and Rate4 derived from the densities in the above pixels are derived such that the closer the pixels are to the above conditions, the higher the trap rates become. Hence, by determining the trap rate Rate from the average of the trap rates Rate1, Rate2, Rate3, and Rate4, it is possible to realize natural trapping under any circumstance.

It should be noted that the trap-rate determining process described above is merely an example. In a case where there are multiple colors other than the trap color, the trap rate may be determined by using the color in the reference pixel that has the highest density among the multiple colors. Alternatively, the average value of the trap rates figured out for all the process colors may be determined as the final trap rate, or each of the above operations may be performed by using some other method. What is important is that the trap rate is determined in such a way as to change gradually according to the densities of the process colors in the target pixel and the reference pixel.

Moreover, in the example described above, the trap rate Rate for the combination of the trap color and each other process color is determined from the average of the trap rates for the aforementioned types of density. However, the present invention is not limited to this case. It is possible to determine the trap rate Rate based on the highest value and the lowest value among the four values, weighting, or mixing.

As described above, in this embodiment, the density of the trap color for trapping (the intensity of trapping) is controlled gradually in a stepwise manner or in a continuous manner by providing an adjustment range based on the densities of the colors in the target pixel and the reference pixel. In this way, it is possible to obtain a fine trapping result even from a gradation image or an image with varying densities. For example, in a case where misregistration occurs in gradation on a printed object, a low density area of the gradation may be printed in a light trap color. By doing so, it is possible to solve the density difference which would otherwise occur due to.

Moreover, by deriving the trap rates Rate1 to Rate4 for the four types of density that need to be taken into consideration at the time of performing trapping, it is possible to obtain a fine trapping result regardless of the relation between the target pixel and the reference pixel in terms of density.

In this embodiment, the method of deriving the trap rate within the adjustment range is linear. However, it is needless to say that the present invention is not limited to this case and the method may be any function or non-linear.

Moreover, although the foregoing example is described by taking an instance where the four colors of CMYK are used, the present invention is applicable to other color combinations.

<Embodiment 2>

Next, image processing according to Embodiment 2 will be described.

This embodiment will be described by taking an example where the trap rate is determined by weighting it according to the distance from the target pixel to the reference pixel which is set as the processing target for determining the trap rate.

Figure 9:
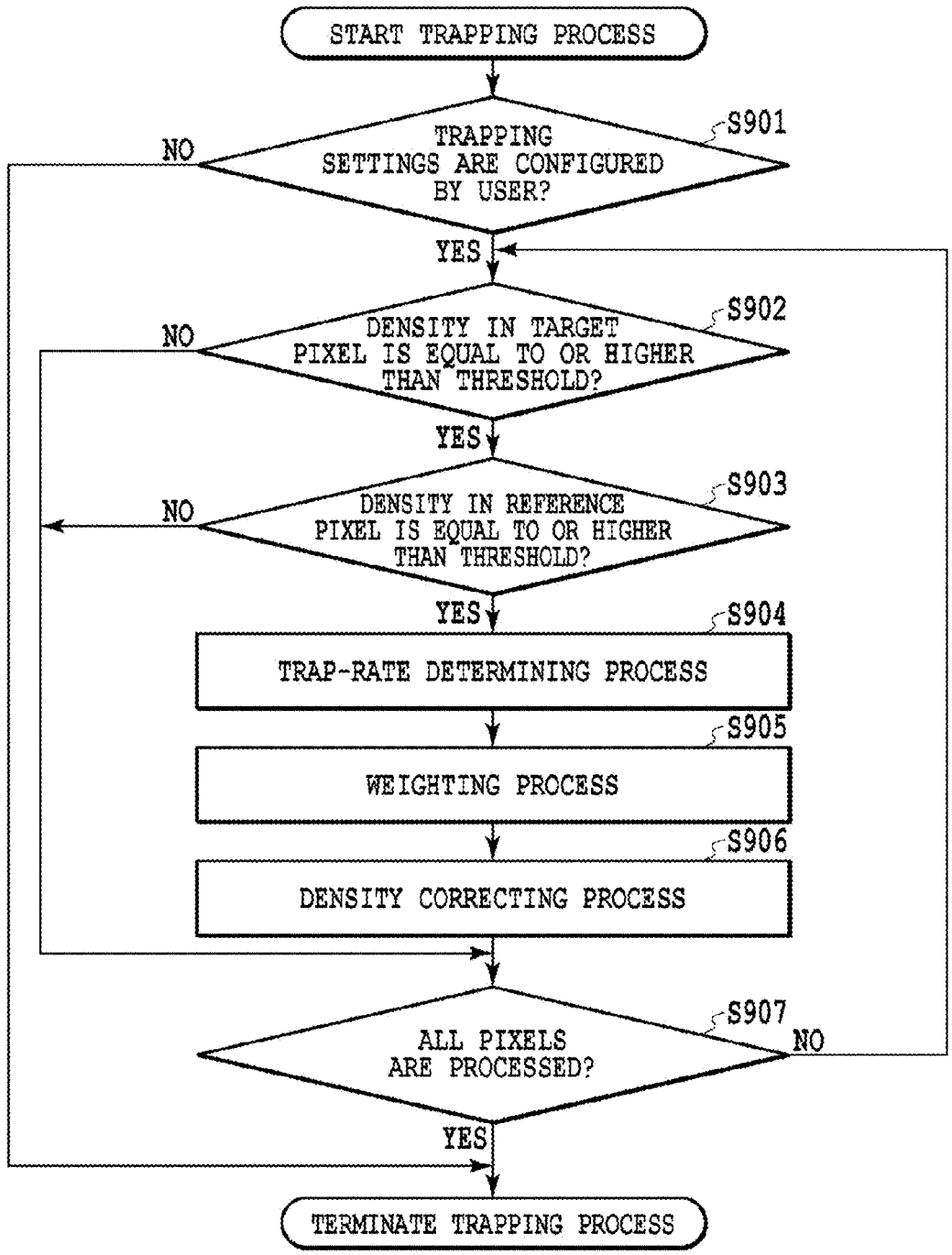
FIG. 9 is a flowchart showing an example of a trap-rate determining process according to Embodiment 2 of the present invention.

FIG. 9 is a flowchart for describing the procedure of a trapping process in an image forming apparatus 100 according to Embodiment 2. Operations in step S901 to S904 can be similar to the operations in steps S301 to S304 in FIG. 3, and therefore description thereof is omitted.

The image processing unit 102 corrects the trap rate determined in step S904, based on weighting performed according to the distance from the target pixel to the reference pixel (step S905). In a case where the distance from the target pixel to the reference pixel is R, the trap rate is corrected by using the following equation. Here, distance R=4 in a case where the processing-target reference pixel is away from the target pixel by four pixels, for example.

$$\text{Corrected Trap Rate Rate}' = \text{Trap Rate Rate}/\text{Distance } R$$

The image processing unit 102 performs a density correcting process (step S906) for correcting the target pixel based on the reference pixel and the trap rate corrected in step S905. The target pixel value is calculated from the following equation.

Density Value of Trap Color for Target Pixel=cpix×Rate', where cpix is the density value of the trap color in the reference pixel, and Rate' is the trap rate. However, as in the case of step S305, the density value of the trap color in the target pixel is outputted as is without changing it (no trapping is performed) if Rate'=0.

The image processing unit 102 determines whether or not all the pixels in the inputted image are processed (step S907). In a case where there is a next pixel, the next pixel is set as the target pixel, and the process proceeds to step S902. The trapping process is terminated in a case where all the pixels are determined to be processed.

By determining the trap rate through the weighting based on the distance from the target pixel to the reference pixel as described above, it is possible to prevent increase in density even in a case where the colors are caused to overlap one another by the trapping process under a condition where the trapping range is wide.

<Other Embodiments>

Each foregoing embodiment is described by taking an image forming apparatus as an example. Moreover, the processes in each foregoing embodiment are described as being performed mainly in the image processing unit (image processing apparatus) inside the image forming apparatus as an example. However, the present invention may be applied to an image processing apparatus connected to an apparatus that performs image formation.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-275787, filed Dec. 18, 2012, which is hereby incorporated by reference herein in its entirety.

What is claimed is:

1. An image processing apparatus for performing a trapping process of increasing a density value of a pixel, comprising:

an inputting unit configured to input image data including a target pixel and a peripheral pixel of the target pixel, the target pixel having a density value of a first color component and a density value of a second color component and the peripheral pixel having a density value of the first color component and a density value of the second color component;

a trapping unit configured to increase, on a basis of at least the density value of the first color component and the density value of the second color component of the target pixel and the density value of the first color component and the density value of the second color component of the peripheral pixel, the density value of the second color component of the target pixel; and a printing unit configured to print the target pixel by using at least the increased density value of the second color component of the target pixel, wherein the trapping unit is configured to calculate a first trap rate by using the density value of the first color component of the target pixel, a second trap rate by using the density value of the second color component of the target pixel, a third trap rate by using the density value of the first color component of the peripheral pixel, and a fourth trap rate by using the density value of the second color component of the peripheral pixel, wherein the trapping unit is configured to calculate a final trap rate by using the first trap rate, the second trap rate, the third trap rate, and the fourth trap rate, wherein the trapping unit is configured to calculate a trap color density value by using the density value of the second color component of the peripheral pixel and the final trap rate, and wherein the trapping unit is configured to increase the density value of the second color component of the target pixel to the trap color density value.

2. The image processing apparatus according to claim 1, wherein the trapping unit increases the density value of the second color component of the target pixel stepwisely on the basis of the density value of the first color component of the target pixel.

3. The image processing apparatus according to claim 1, wherein the trapping unit increases the density value of the second color component of the target pixel such that the lower the density value of the second color component of the target pixel within a predetermined density value range is, the higher the increased density value of the second color component of the target pixel is.

4. The image processing apparatus according to claim 1, wherein the trapping unit increases the density value of the second color component of the target pixel such that the higher the density value of the second color component of the peripheral pixel within a predetermined density value range is, the higher the increased density value of the second color component of the target pixel is.

5. The image processing apparatus according to claim 1, wherein the trapping unit increases the density value of the second color component of the target pixel such that the lower the density value of the first color component of the peripheral pixel within a predetermined density value range is, the higher the increased density value of the second color component of the target pixel is.

6. The image processing apparatus according to claim 1, wherein the trapping unit increases the density value of the second color component of the target pixel on the basis of the density value of the first color component of the target pixel, the density value of the second color component of a peripheral pixel of the target pixel, and a distance between the target pixel and the peripheral pixel.

7. The image processing apparatus according to claim 1,
wherein the first trap rate indicates a degree of a contribution to the density values of the second color component of the target pixel relative to the density value of the first color component of the target pixel,
wherein the second trap rate indicates a degree of a contribution to the density values of the second color component of the target pixel relative to the density value of the second color component of the target pixel
wherein the first trap rate indicates a degree of a contribution to the density values of the second color component of the target pixel relative to the density value of the first color component of the peripheral pixel
wherein the first trap rate indicates a degree of a contribution to the density values of the second color component of the target pixel relative to the density value of the second color component of the peripheral pixel.

8. The image processing apparatus according to claim 1, wherein the trap color density value is calculated by multiplying the density value of the second color component of the peripheral pixel by the final trap rate.

* * * * *